(12) United States Patent
Romesburg

(10) Patent No.: US 6,850,783 B1
(45) Date of Patent: Feb. 1, 2005

(54) METHODS AND APPARATUS FOR MITIGATING THE EFFECTS OF MICROPHONE OVERLOAD IN ECHO CANCELATION SYSTEMS

(75) Inventor: Eric Douglas Romesburg, Chapel Hill, NC (US)

(73) Assignee: Ericsson Inc., Research Triangle Park, NC (US)

( * ) Notice: Subject to any disclaimer, the term of this patent is extended or adjusted under 35 U.S.C. 154(b) by 840 days.

(21) Appl. No.: 09/131,167

(22) Filed: Aug. 7, 1998

(51) Int. Cl.[7] .................................................. H04B 1/00
(52) U.S. Cl. ................ 455/570; 379/406.04; 455/569.1
(58) Field of Search ................................ 455/569, 570, 455/569.1; 379/420, 406, 410, 411, 406.04; 381/96, 95, 93

(56) References Cited

U.S. PATENT DOCUMENTS

| | | | |
|---|---|---|---|
| 5,323,459 A | | 6/1994 | Hirano |
| 5,465,413 A | * | 11/1995 | Enge et al. .................. 455/307 |
| 5,475,731 A | | 12/1995 | Rasmusson |
| 5,636,323 A | * | 6/1997 | Umemoto ................... 395/2.35 |
| 5,721,772 A | * | 2/1998 | Haneda ....................... 379/406 |
| 5,872,728 A | * | 2/1999 | Richter ..................... 364/724.2 |
| 5,884,194 A | * | 3/1999 | Shiraki ........................ 455/570 |
| 5,911,124 A | * | 6/1999 | Doran .......................... 455/570 |
| 6,002,950 A | * | 12/1999 | Muraoka ..................... 455/570 |
| 6,044,068 A | * | 3/2000 | El Malki ..................... 370/286 |
| 6,192,126 B1 | * | 2/2001 | Koski .......................... 379/410 |

* cited by examiner

Primary Examiner—Nick Corsaro
(74) Attorney, Agent, or Firm—Coats & Bennett, P.L.L.C.

(57) ABSTRACT

Methods and apparatus for echo and noise cancelation contemplate occasional saturation of an echo and/or noise containing source signal and control adaptation of a cancelation filter to minimize the detrimental effects of such source signal saturation. According to exemplary embodiments, filter coefficients of an adaptive filter are updated only when a prevailing value of the source signal is within a predetermined range of possible source signal values. Consequently, the filter response is not perturbed by source signal saturation, and the adaptive filter continues to provide quality echo suppression even immediately following periods of saturation.

41 Claims, 2 Drawing Sheets

METHODS AND APPARATUS FOR MITIGATING THE EFFECTS OF MICROPHONE OVERLOAD IN ECHO CANCELATION SYSTEMS

BACKGROUND OF THE INVENTION

The present invention relates to communications systems, and more particularly, to echo cancelation in a bi-directional communications link.

In many communications systems, for example landline and wireless telephone systems, voice signals are often transmitted between two system users via a bi-directional communications link. In such systems, speech of a near-end user is typically detected by a near-end microphone at one end of the communications link and then transmitted over the link to a far-end loudspeaker for reproduction and presentation to a far-end user. Conversely, speech of the far-end user is detected by a far-end microphone and then transmitted via the communications link to a near-end loudspeaker for reproduction and presentation to the near-end user. At either end of the communications link, loudspeaker output detected by a proximate microphone may be inadvertently transmitted back over the communications link, resulting in what may be unacceptably disruptive feedback, or echo, from a user perspective. Furthermore, if the round-trip loop gain is greater than unity at any audible frequency, then the system will tend to "howl" as is well known in the art.

Therefore, in order to avoid transmission of such undesirable echo signals, the microphone acoustic input should be isolated from loudspeaker output as much as possible. With a conventional telephone handset, in which the handset microphone is situated close to the user's mouth while the handset speaker essentially covers the user's ear, the requisite isolation is easily achieved. However, as the physical size of portable telephones has decreased, and as hands-free speaker-phones have become more popular, manufacturers have moved toward designs in which the acoustic path from the loudspeaker to the microphone is not blocked by the user's head or body. As a result, the need for more sophisticated echo suppression techniques has become paramount in modern systems.

The need is particularly pronounced in the case of hands-free automobile telephones, where the closed vehicular environment can cause multiple reflections of a loudspeaker signal to be coupled back to a high-gain hands-free microphone. Movement of the user in the vehicle and changes in the relative directions and strengths of the echo signals, for example as windows are opened and closed or as the user moves his head while driving, further complicate the task of echo suppression in the automobile environment. Additionally, more recently developed digital telephones process speech signals through vocoders which introduce significant signal delays and create non-linear signal distortions. As is well known, these prolonged delays tend to magnify the problem of signal echo from a user perspective, and the additional non-linear distortions can make echo suppression difficult once a speech signal has passed through a vocoder.

Conventionally, echo suppression has been accomplished using echo canceling circuits which employ adaptive filters to estimate and remove echo signals from a microphone output so that only near-end speech and noise are transmitted over the communications link. Such systems are described, for example, in U.S. Pat. No. 5,475,731, entitled "Echo-Canceling System and Method Using Echo Estimate to Modify Error Signal" and issued Dec. 12, 1995, and U.S. patent application Ser. No. 08/578,944, entitled "Gauging Convergence of Adaptive Filters" and filed Dec. 27, 1995, each of which is incorporated herein by reference. More recent advances in such adaptive filtering technology are described, for example, in U.S. patent application Ser. No. 08/852,729, entitled "An Improved Echo Canceler for use in Communications Systems" and filed May 7, 1997, U.S. patent application Ser. No. 09/005,149, entitled "Methods and Apparatus for Improved Echo Suppression in Communications Systems" and filed Jan. 9, 1998, and U.S. patent application Ser. No. 09/005,144, entitled "Methods and Apparatus for Controlling Echo Suppression in Communications Systems" and filed Jan. 9, 1998, each of which is also incorporated herein by reference.

Though each of the above identified adaptive filtering techniques generally works well and provides certain advantages, practical experience has demonstrated that each such adaptive filtering technique does not work well when the source signal (e.g., the near-end microphone signal) becomes saturated. In other words, when the magnitude of the source signal falls outside or near the boundaries of the allowable range of components in the signal processing path, the echo cancelation provided by such adaptive filtering techniques is significantly diminished both during and immediately following the period of saturation. This can be a significant disadvantage in practice, as saturation of the source signal is commonplace in many echo cancelation applications. For example, in the context of mobile telephony, a microphone is typically situated directly in front of a user's mouth, and high sound pressure resulting from plosive sounds (such as "p") often overload the microphone and/or an analog-to-digital converter following the microphone. Consequently, there is a need for improved methods and apparatus for canceling echo in source signals which can at times become saturated.

SUMMARY OF THE INVENTION

The present invention fulfills the above-described and other needs by providing methods and apparatus for echo cancelation, wherein occasional saturation of an echo-containing source signal is expected, and wherein adaptation of an echo cancelation filter is controlled so as to minimize the detrimental effects of such saturation. According to exemplary embodiments, filter coefficients of an adaptive filter are updated only when the signed magnitude of the source signal is within a predetermined range of possible values (e.g., above or below a single preset threshold or between two separate preset thresholds). As a result, the filter response is not perturbed by saturation (i.e., instances when the source signal falls outside the predetermined range), and the adaptive filter continues to provide quality echo suppression even immediately following periods of source signal saturation.

In a first exemplary embodiment, a communications device according to the invention includes a microphone, a loudspeaker, an adaptive filter configured to estimate an echo component of an output signal of the microphone based on an input signal of the loudspeaker, and a summing device configured to remove the echo estimate from the output signal of the microphone and to thereby provide an echo canceled output signal. According to the embodiment, filter coefficients of the adaptive filter are updated only when a prevailing value of the output signal of the microphone is within a predetermined range of possible output signal values. For example, the filter coefficients of the adaptive filter are updated only when the prevailing value of the output signal of the microphone is above or below a single predetermined threshold value or between two separate predetermined threshold values. Where the filter coefficients are updated in a sample-wise fashion, updates are performed only when the value of a corresponding sample of the output signal of the microphone is within the predetermined range of values. However, where the filter coefficients are updated in a blockwise fashion, updates are performed only when the value of each one of a number of (i.e., one or more) corresponding samples of the microphone output signal is within the predetermined range of values.

According to another exemplary embodiment, a communications device includes an adaptive system configured to estimate a component of a signal, wherein variables of the adaptive system are updated only when a prevailing value of the signal is within a predetermined range of possible signal values. The component of the signal can be, for example, an echo component and/or a noise component, and the device can be configured, for example, to operate as an acoustic echo canceler, a network echo canceler, a noise suppressor, or a spectral subtraction processor.

The above-described and other features and advantages of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

DETAILED DESCRIPTION OF THE INVENTION

Figure 1:
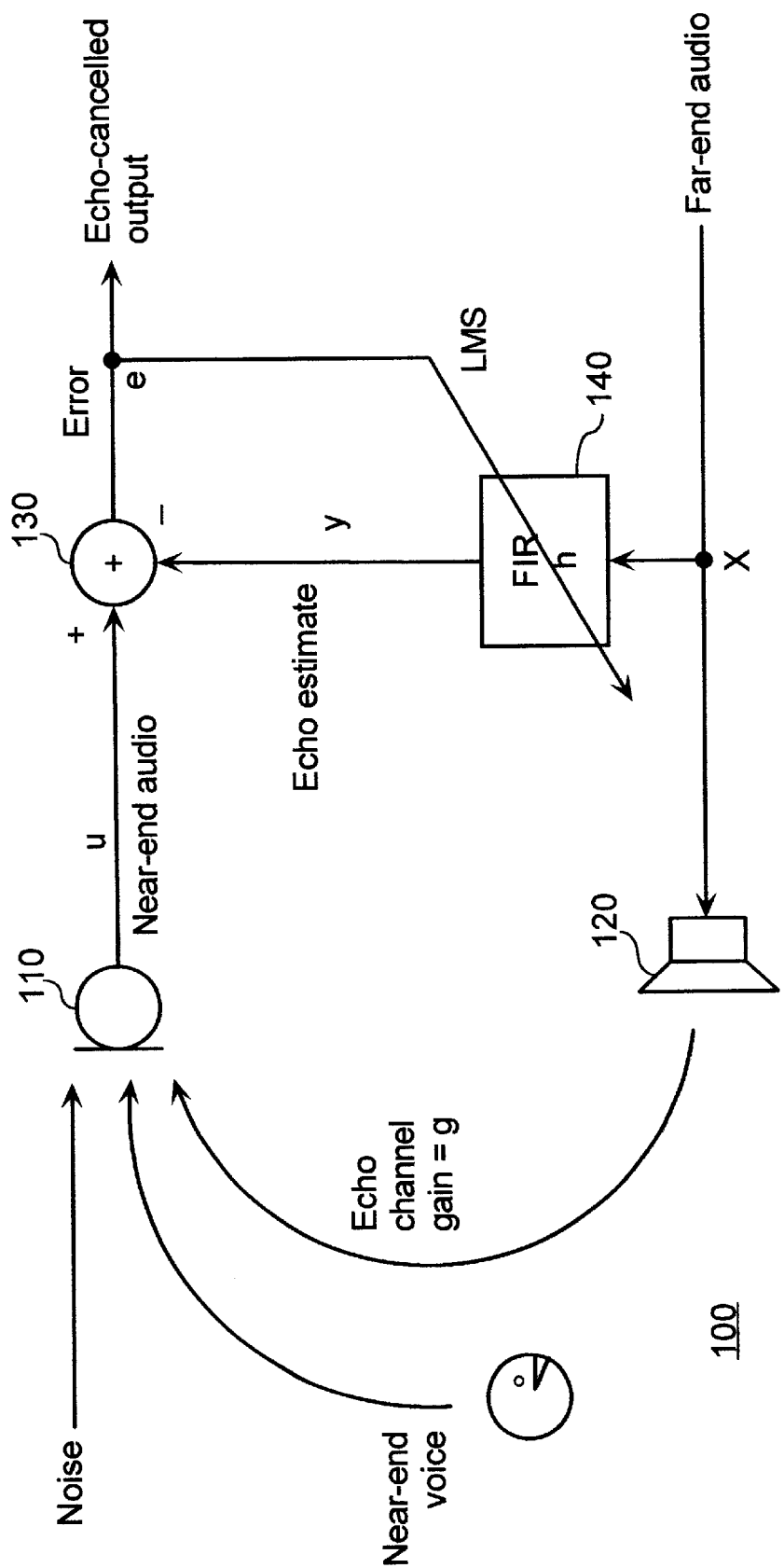
FIG. 1 is a block diagram of an exemplary echo cancelation device in which the techniques of the present invention can be implemented.

FIG. 1 depicts an exemplary echo cancelation system 100 in which the teachings of the present invention can be implemented. As shown, the exemplary system 100 includes a microphone 110, a loudspeaker 120, a summing device 130 and an adaptive filter 140. Near-end sound, including near-end speech, noise and loudspeaker echo is received at an acoustic input of the microphone 110, and an audio output u of the microphone 110 is coupled to an additive input of the summing device 130. An audio output, or error signal e provided by the summing device 130 is fed back to the adaptive filter 140 and also provides an echo canceled output signal for the echo cancelation system 100. Additionally, a far-end signal x, including far-end speech, noise and possibly near-end echo, is coupled to an audio input of the adaptive filter 140 and to an audio input of the loudspeaker 120.

In operation, the echo-containing near-end signal u is sampled via an analog-to-digital converter (not shown in FIG. 1). The echo estimate y, generated by the adaptive filter 140, is then subtracted from the sampled microphone signal u, via the summing device 130, to provide the echo canceled output signal e. The output signal e, also referred to in the art as the error signal (since during periods of no near-end speech, and assuming no near-end noise, the output signal should be zero for total echo cancelation), is fed back to the adaptive filter 140 for use in generating the echo estimate y.

Specifically, the adaptive filter 140 generates the echo estimate y by convolving samples of the far-end signal x (which is also sampled and potentially interpolated by components not shown in FIG. 1) with coefficients of a transfer function h which is typically updated according to some form of Least Mean Squares (LMS) or Normalized Least Mean Squares (NLMS) algorithm. For example, according to the most basic LMS algorithm, the various signals of FIG. 1 are computed as follows:

$$y(n) = \sum_{i=0}^{m-1} h_i(n) \cdot x(n-i)$$

where the variable c is an update gain which determines the rate at which the filter 140 adapts to changes in the near-end echo path. Each of the above incorporated U.S. Patents and U.S. Patent Applications (see the Background of the Invention above) describes one or more variations of this approach, each variation providing certain advantages. Those skilled in the art will appreciate, however, that the exemplary LMS algorithm, as well as the algorithms described in the above incorporated patents and patent applications, are provided for purposes of illustration only and that the teachings of the present invention described herein are equally applicable to any form of adaptive filter which can be used for echo cancelation.

As noted above, saturation of the microphone signal u (e.g., when the magnitude of the signal exceeds or approaches the limits of the input range of the analog-to-digital converter following the microphone) can cause significant performance degradation with respect to echo cancelation. Empirical studies have demonstrated that such degradation results from the fact that the acoustic echo path is extremely non-linear during periods of signal saturation. As a result, conventional echo cancelers attempt to adapt to a false echo path during periods of saturation and, once a period of saturation ends, the transfer function estimate of a conventional echo canceler is typically less accurate than it was prior to the period of saturation. Consequently, a conventional echo canceler typically passes an unacceptable level of echo until it has had time to retrain the transfer function following saturation.

Advantageously, the present invention demonstrates that such false training of the echo canceler transfer function can be avoided by limiting, ceasing, or pausing filter coefficient updates during periods of signal saturation. By doing so, a prevailing filter transfer function is not falsely perturbed by signal saturation, and an echo canceler constructed in accordance with the invention is less susceptible to performance degradation resulting from signal saturation.

Figure 2:
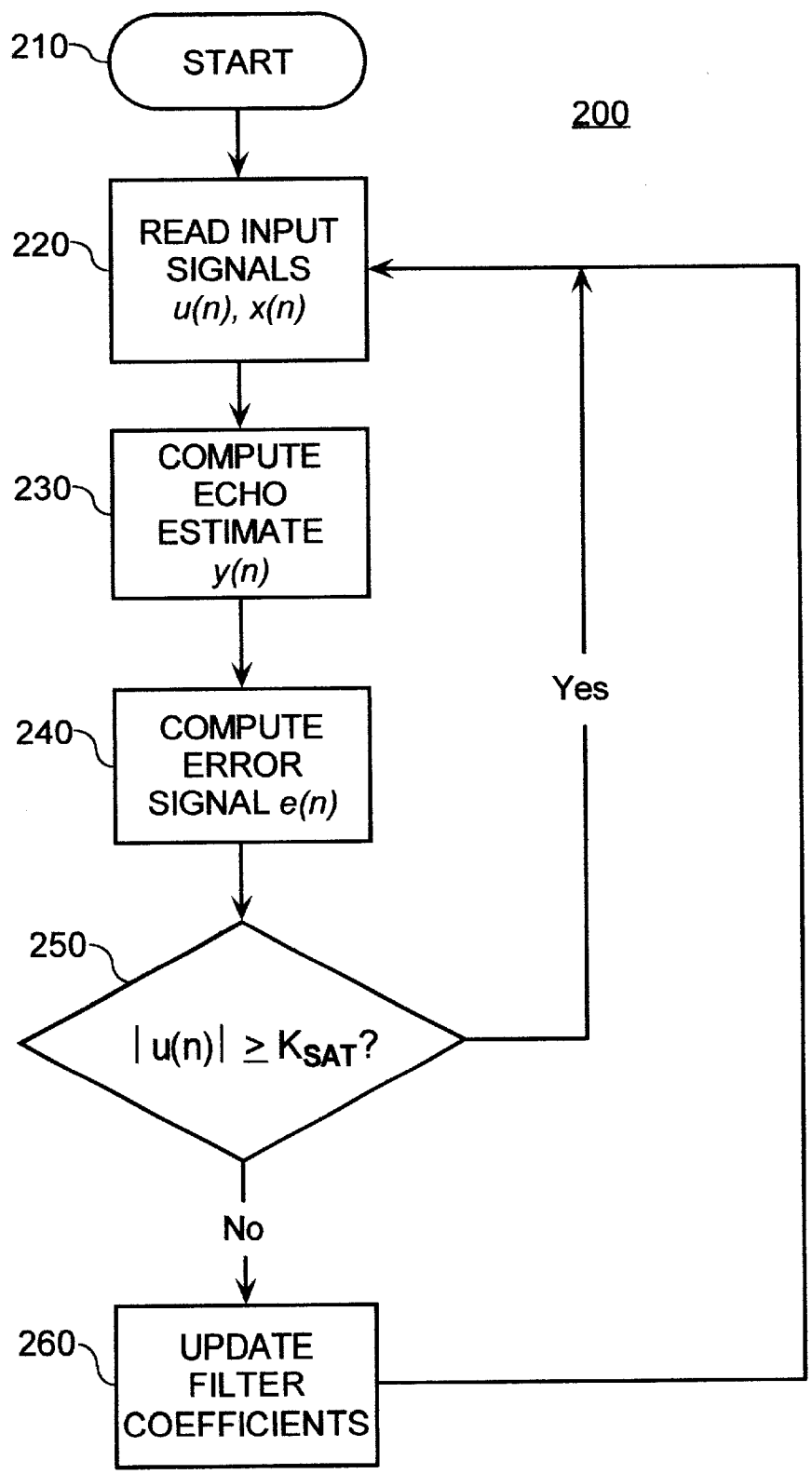
FIG. 2 is a flow chart depicting steps in an exemplary method for mitigating the effects of microphone saturation according to the invention.

FIG. 2 depicts steps in an exemplary method 200 for mitigating the effects of source signal saturation according to the invention. As shown, the sample-wise method 200 begins at step 210, and samples of the near-end and far-end signals u(n), x(n) are read in at step 220. At step 230, a sample of the echo estimate y(n) is computed based on the near-end and far-end signal samples u(n), x(n) (e.g., using the above described LMS convolution), and at step 240, a sample of the error signal e(n) is computed by subtracting the echo estimate sample y(n) from the near-end sample u(n). At step 250, a decision is made as to whether the absolute value of the near-end signal sample u(n) is greater than or equal to a predetermined saturation constant, or threshold $K_{SAT}$. If the absolute value of the near-end signal sample u(n) is greater than or equal to the saturation constant $K_{SAT}$ (indicating that the input signal u is saturated), then the filter coefficients $h_i$ are not updated and processing of the next input sample resumes immediately at step 220. However, if the absolute value of the near-end signal sample u(n) is less than the saturation constant $K_{SAT}$ (indicating that the input signal u is not saturated), then the filter coefficients $h_i$ are updated (e.g., using a form of LMS or NLMS algorithm) before processing of the next input sample resumes at step 220. If the filter coefficients $h_i$ are computed in blockwise fashion (i.e., updated once every block of l input samples) as described, for example, in the above incorporated U.S. patent application Ser. No. 08/852,729 (entitled "An Improved Echo Canceler for use in Communications Systems" and filed May 7, 1997), then filter coefficient updates for an entire sample block can be skipped if any one input sample, or any subset of input samples, in the block is saturated (e.g., has an absolute value greater than the saturation constant $K_{SAT}$).

The saturation constant $K_{SAT}$ can be set based upon the type of components used in the near-end signal processing path. For example, if a sampling type analog-to-digital converter is used to digitize the microphone signal u, then the saturation constant $K_{SAT}$ can be set at or near the full scale value of the input range of the analog-to-digital converter. If, however, a $\Sigma$-$\Delta$ type analog-to-digital converter is used (e.g., sampling at 64 kHz and then low pass filtering and decimating to 8 kHz is typical in many mobile telephone applications), then the saturation constant $K_{SAT}$ can be set depending upon whether the system designer has access to the higher sample rate (e.g., the 64 kHz rate). For example, if an off-the-shelf $\Sigma$-$\Delta$ converter is used, then the echo-canceler designer will not have access to the higher, internal sample rate, and saturation testing can be performed on the lower, output sample rate. In such case, the saturation constant $K_{SAT}$ can be set below full scale to account for a worst case ringing effect in the $\Sigma$-$\Delta$ converter. If, on the other hand, the $\Sigma$-$\Delta$ conversion is performed by the digital signal processor being designed for echo cancelation, then saturation testing can be performed directly on the higher sample rate to ensure that even very short saturation periods are detected. In each of the above described scenarios, the saturation constant $K_{SAT}$ can be reduced below full scale to account for analog compression introduced by components in the near-end signal processing path.

Comparison of the absolute value of the near-end signal u(n) with a single saturation constant (i.e., step 250 of FIG. 2) is but one possible technique for determining whether coefficient updates should be performed. Alternatively, a signed amplitude of the near-end signal u(n) can be compared to a single saturation constant (and updates performed only if the signed amplitude is above or below the single saturation constant) or to two or more separate saturation constants (and updates performed only if, for example, the signed amplitude is between two particular saturation constants). In general, the determination of whether updates should be performed can be based on an assessment of whether a value (e.g., the magnitude or the signed magnitude) of the near-end signal u(n) lies within a predetermined range, region or window of possible values. In any case, the one or more saturation thresholds can be either static or dynamically adjustable during system operation.

Those skilled in the art will appreciate that the present invention is not limited to the specific exemplary embodiments which have been described herein for purposes of illustration and that numerous alternative embodiments are also contemplated. For example, although the exemplary embodiments have been described with respect to acoustic echo cancelation, the teachings of the invention are equally applicable in the context of network echo cancelation (e.g., echoes resulting from mismatches at a hybrid junction). Indeed, the teachings of the invention are generally applicable in any context in which an adaptive system is used to process a source signal (e.g., in the case of an adaptive noise canceler or a spectral subtraction processor). The scope of the invention is therefore defined by the claims appended hereto, rather than the foregoing description, and all equivalents consistent with the meaning of the claims are intended to be embraced therein.

I claim:

1. A communications device, comprising:
   a microphone;
   a loudspeaker;
   an adaptive filter configured to estimate an echo component of an output signal of said microphone based on an input signal of said loudspeaker; and
   a summing device configured to remove the echo estimate from the output signal of the microphone and to thereby provide an echo canceled output signal, wherein the adaptive filter updates filter coefficients only when a prevailing value of the output signal of said microphone is within a predetermined range of possible output signal values less than a total range of possible output signal values.

2. A communications device according to claim 1, wherein the filter coefficients of said adaptive filter are updated only when the prevailing value of the output signal of said microphone is below a predetermined threshold value.

3. A communications device according to claim 1, wherein the filter coefficients of said adaptive filter are updated only when the prevailing value of the output signal of said microphone is above a predetermined threshold value.

4. A communications device according to claim 1, wherein the filter coefficients of said adaptive filter are updated only when the prevailing value of the output signal of said microphone is below a first predetermined threshold value and above a second predetermined threshold value.

5. A communications device according to claim 4, further comprising one of a sampling analog-to-digital converter and a $\Sigma$-$\Delta$ analog-to-digital converter, said one analog-to-digital converter being configured to digitize the output signal of said microphone, wherein said first predetermined threshold value is less than or equal to an upper full-scale value of said analog-to-digital converter, and wherein said second predetermined threshold value is greater than or equal to a lower full-scale value of said analog-to-digital converter.

6. A communications device according to claim 4, wherein at least one of the first and second predetermined threshold values is adjusted to account for analog distortion.

7. A communications device according to claim 4, wherein said one analog-to-digital converter is a $\Sigma$-$\Delta$ converter and wherein at least one of the predetermined threshold values is adjusted to account for ringing of said $\Sigma$-$\Delta$ converter.

8. A communications device according to claim 1, wherein said communications device is configured to operate as a mobile telephone.

9. A communications device according to claim 1, wherein the filter coefficients of said adaptive filter are updated according to a Least Mean Squares (LMS) algorithm.

10. A communications device according to claim 1, wherein the filter coefficients of said adaptive filter are updated according to a Normalized Least Mean Squares (NLMS) algorithm.

11. A communications device according to claim 1, wherein the filter coefficients are updated in a sample-wise fashion and wherein a sample-wise update of the filter coefficients is performed only when a value of a corresponding sample of the output signal of said microphone is within a predetermined range of possible values.

12. A communications device according to claim 1, wherein the filter coefficients are updated in a blockwise fashion and wherein a blockwise update of the filter coefficients is performed only when a value of each one of a number of corresponding samples of the output signal of said microphone is within a predetermined range of possible output signal values.

13. An echo canceler for use in a communications device including a microphone and a loudspeaker, said echo canceler comprising:
an adaptive filter configured to estimate an echo component of an output signal of the microphone based on an input signal of the loudspeaker; and
a summing device configured to remove the echo estimate from the output signal of the microphone and to thereby provide an echo canceled output signal,
wherein the adaptive filter updates filter coefficients only when a prevailing value of the output signal of the microphone is within a predetermined range of possible output signal values less than a total range of possible output signal values.

14. An echo canceler according to claim 13, wherein the filter coefficients of said adaptive filter are updated only when the prevailing value of the output signal of the microphone is below a predetermined threshold value.

15. An echo canceler according to claim 13, wherein the filter coefficients of said adaptive filter are updated only when the prevailing value of the output signal of the microphone is above a predetermined threshold value.

16. An echo canceler according to claim 13, wherein the filter coefficients of said adaptive filter are updated only when the prevailing value of the output signal of the microphone is below a first predetermined threshold value and above a second predetermined threshold value.

17. A communications device, comprising:
an adaptive system configured to estimate a component of a source signal, wherein the adaptive system updates variables only when a prevailing value of the source signal is within a predetermined range of possible source signal values less than a total range of possible output signal values.

18. A communications device according to claim 17, wherein the component of the source signal is an echo component.

19. A communications device according to claim 17, wherein the component of the source signal is a noise component.

20. A communications device according to claim 17, further comprising a device for removing the component estimate from the source signal and to thereby provide a component-canceled output signal.

21. A communications device according to claim 17, wherein said source signal is a microphone output signal, wherein said component estimate is computed based on a loudspeaker input signal, and wherein said communications device is configured to operate as an acoustic echo canceler.

22. A communications device according to claim 17, wherein said source signal is a far-end communications signal, wherein said component estimate is computed based on a near-end communications signal, and wherein said communications device is configured to operate as a network echo canceler.

23. A communications device according to claim 17, wherein said communications device is configured to operate as a noise suppressor.

24. A communications device according to claim 17, wherein said communications device is configured to operate as spectral subtraction processor.

25. A method for canceling and echo component of a communications signal, the echo component resulting from and echo-causing signal, said method comprising the steps of:
filtering the echo causing signal using an adaptive filter to provide an estimate of the echo component of the communications signal;
subtracting the echo estimate from the communications signal to provide an echo canceled output signal; and
updating filter coefficients of the adaptive filter, based on the echo canceled output signal and the echo causing signal, only when a prevailing value of the communications signal is within a predetermined range of possible signal values less than a total range of possible output signal values.

26. The method of claim 25, wherein said step of updating filter coefficients of the adaptive filter comprises the steps of:
comparing the prevailing value of the communications signal with a predetermined threshold value; and
updating the filter coefficients only if the prevailing value is less than the predetermined threshold value.

27. The method of claim 25, wherein said step of updating filter coefficients of the adaptive filter comprises the steps of:
comparing the prevailing value of the communications signal with a predetermined threshold value; and
updating the filter coefficients only if the prevailing value is greater than the predetermined threshold value.

28. The method of claim 25, wherein said step of updating filter coefficients of the adaptive filter comprises the steps of:
comparing the prevailing value of the communications signal with first and second predetermined threshold values; and
updating the filter coefficients only if the prevailing value is less than the first predetermined threshold value and greater than the second predetermined threshold value.

29. The method of claim 28, wherein one of a sampling analog-to-digital converter and a $\Sigma$-$\Delta$ analog-to-digital converter is used to digitize the output signal of said microphone, wherein the first predetermined threshold value is less than or equal to a upper full-scale value of said analog-to-digital converter, and wherein the second predetermined threshold value is greater than or equal to a lower full-scale value of said analog-to-digital converter.

30. The method of claim 29, wherein at least one of the predetermined threshold values is adjusted to account for analog compression.

31. The method of claim 29, wherein said one analog-to-digital converter is a $\Sigma$-$\Delta$ converter and wherein at least one of the predetermined threshold values is adjusted to account for ringing of said converter.

32. The method of claim 25, wherein the communications signal is a microphone signal and wherein the echo causing signal is a loudspeaker signal.

33. The method of claim 25, wherein the communications signal is a near-end speech signal and wherein the echo causing signal is a far-end speech signal.

34. The method of claim 25, wherein the filter coefficients of the adaptive filter are updated according to a Least Mean Square (LMS) algorithm.

35. The method of claim 25, wherein the filter coefficients of the adaptive filter are updated according to a Normalized Least Mean Square (NLMS) algorithm.

36. The method of claim 25, wherein the filter coefficients are updated in a sample-wise fashion and wherein a sample-wise update of the filter coefficients is performed only when a value of a corresponding sample of the communications signal is within a predetermined range of possible signal values.

37. The method of claim 25, wherein the filter coefficients are updated in a blockwise fashion and wherein a blockwise update of the filter coefficients is performed only when a value of each one of a number of corresponding samples of the communications signal is within a predetermined range of possible signal values.

38. An echo canceler for use in a communications device including a microphone and a loudspeaker, said echo canceler comprising:

an adaptive filter that estimates an echo component of an output signal of the microphone based on an input signal of the loudspeaker;

means for updating filter coefficients of said adaptive filter only when an absolute value of the output signal of the microphone is less than a saturation constant; and a summing device that removes the echo estimate from the output signal of the microphone, thereby providing an echo canceled output signal.

39. The communications device of claim 38, wherein the saturation constant is based on at least one component used in a signal path of the microphone output.

40. The communications device of claim 39, wherein the at least one component is a sampling type analog-to-digital converter that is used to digitize the microphone output signal, and wherein the saturation constant is set at about a full scale value of an input range of said analog-to-digital converter.

41. The communications device of claim 39, wherein the at least one component is a $\Sigma$-$\Delta$ type analog-to-digital converter that is used to digitize the microphone output signal, and wherein the saturation constant is set below a full scale value of an input range of said analog-to-digital converter to account for ringing of said converter.

* * * * *